Nov. 13, 1928.
F. OSKRIT
PIPE AND PLATE CONNECTION
Filed Oct. 22, 1924
1,691,609
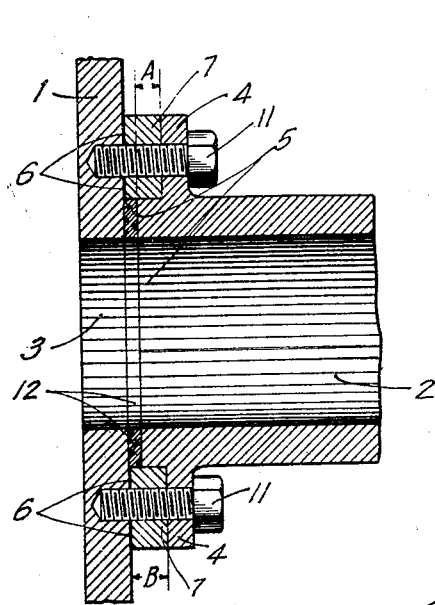
FIG. 2
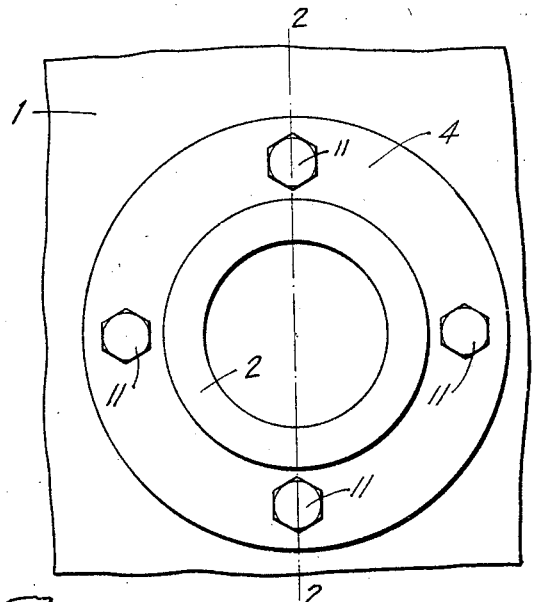
FIG. 1
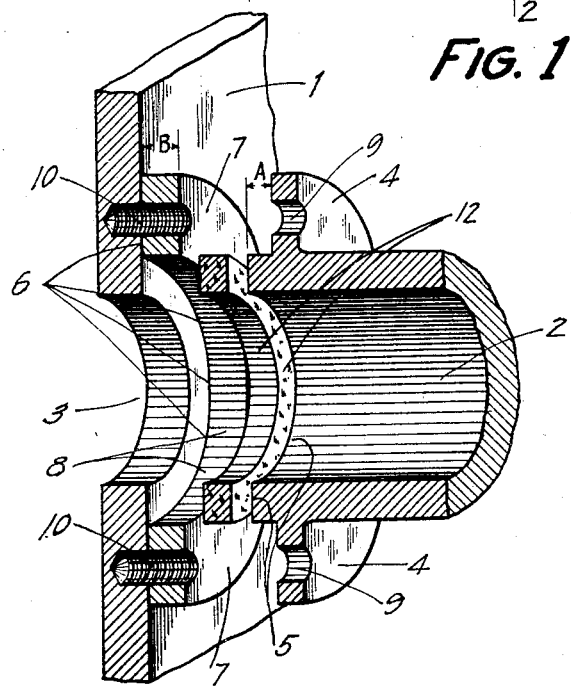
FIG. 3
INVENTOR
Frank Oskrit
BY 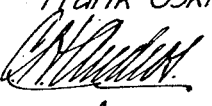
ATTORNEY Patented Nov. 13, 1928.

1,691,609

UNITED STATES PATENT OFFICE.

FRANK OSKRIT, OF PITTSFIELD, MASSACHUSETTS.

PIPE AND PLATE CONNECTION.

Application filed October 22, 1924. Serial No. 745,247.

My invention relates to pipe and plate connections or couplings and particularly to connections of the character which are fluid tight, and in which the operation of connecting and disconnecting may be conducted on one side only of the plate. My invention is particularly adapted for connecting radiator pipes to transformer casings and pipes to boilers or the like in which it is difficult if not impossible to reach the interior of the casing or boiler in the vicinity of the connection.

The present practice in making fluid tight joints between transformer casings and the radiator pipes is to weld them. Joints of this character frequently break or leak, and to replace them, necessitates taking down the transformer so that access may be had to the interior of the casing, and so that the intense heat developed in the welding process will not injure the transformer windings.

The objects of my invention therefore, are to provide a fluid tight joint which may be connected or disconnected wholly from the outside of a closed casing; which will be structurally rigid; and in which the gasket or packing will be compressed uniformly to a limited extent, and will be protected from injury resulting from drawing up the connecting screws or bolts too tightly, or resulting from stresses tending to break or distort the connection.

I accomplish these objects generally by providing male and female interfitting portions on the pipe and plate and limiting the depth or extent of the penetration of the male member by the intimate contact of other portions of the pipe and plate as the joint is tightened, thus providing a gasket or packing space of definite thickness between the end of the male member and the bottom of the female member.

My invention therefore consists in the novel elements, and the arrangement and cooperation thereof as described and claimed below, and illustrated in the accompanying drawing, in which—

Fig. 1 is an end or front view of my connection;

Fig. 2 is a section on the line 2—2 of Fig. 1; and

Fig. 3 is a perspective section similar to Fig. 2 in which the elements are shown in slightly separated relation.

In the drawing, 1 represents a fragmentary portion of the plate or casing to which the pipe 2, is to be connected, and which is provided with the opening, 3, equal to the inside diameter of pipe, 2.

The pipe, 2, is provided with a flange, A, which is preferably cast integral therewith or which may, of course, be welded thereto, as is well known. The flange, 4, is not precisely at the end of the pipe but is disposed therefrom a small distance, 4, so that the barrel of the pipe projects slightly from the flange, to form the male member, 5, of the connection.

Welded, as at 6, to the plate, 1, is the plate, 7, which is preferably circular in form and substantially equal in diameter to the flange, 4. The plate, 7, is provided with a circular opening, 8, concentric with opening, 3, and adapted to receive or fit over the member, 5, thus forming the female element of the connection. The annular ring or plate, 7, is of thickness, B, which is somewhat greater than A, the length of the member, 5, thus providing an annular packing or gasket receiving space of definite thickness, B—A, between the end of the pipe, 2, and plate, 1, when the connection is completed.

The flange, 4, is provided with suitable holes, 9, which are adapted to register with threaded holes, 10, in the plate 7, and which may extend into, but not through plate 1, for receiving the cap screws, 11.

Between the end of the pipe, 2, and the plate, 1, is placed a compressible elastic gasket, 12, preferably of cork, or cork composition. The initial thickness of the gasket, 12, being of course, somewhat greater than the distance, B—A, so that it will be considerably compressed to form a fluid tight joint when the cap screws are tightened.

From a consideration of the foregoing it will be evident that as the cap screws are tightened the gasket, 12, will be uniformly compressed until the flange is in contact with the plate or ring, 7, and that the screws may then be turned very tightly without injuring the gasket, thus making a very rigid, metal to metal joint, which will be fluid tight.

While I have shown and described my invention in its preferred form only, I do not wish to limit myself to the precise details set forth for it is obvious that modifications and changes within the scope of the appended claims may be made without departing from the true spirit of my invention.

What I claim is—

1. In a connection of the character described, the combination with a casing of comparatively thin metal having an opening therein, of a pipe, a flange on said pipe disposed from the end thereof, a plate provided with an opening therein adapted to receive the end of the pipe and welded to said casing around the opening, a gasket between the end of the pipe and the casing, and a plurality of cap screws passing through said flange and engaging threaded openings in said plate for securing the pipe and casing together.

2. In a connection of the character described, the combination with a casing having an opening therein, of a pipe, a flange on said pipe disposed from the end thereof, a plate provided with an opening therein adapted to receive the end of the pipe and welded to said casing around the opening, and a plurality of cap screws extending through said flange and plate and engaging but not completely penetrating said casing; the thickness of said plate being somewhat greater than the distance between the end of the pipe and the flange whereby a packing recess is provided between the casing and the end of the pipe when the flange and plate are in intimate contact.

FRANK OSKRIT.